(12) United States Patent
Weir et al.

(10) Patent No.: US 7,992,104 B2
(45) Date of Patent: Aug. 2, 2011

(54) VIEWING DATA

(75) Inventors: Jeffrey Jon Weir, Seattle, WA (US);
Karim Taji Farouki, Seattle, WA (US);
Katie Jane Messerly, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 11/938,914

(22) Filed: Nov. 13, 2007

(65) Prior Publication Data

US 2009/0125844 A1    May 14, 2009

(51) Int. Cl.
*G06F 3/048* (2006.01)
*G06T 11/20* (2006.01)

(52) U.S. Cl. ........ 715/838; 715/738; 715/810; 715/835; 345/440

(58) Field of Classification Search .................. 715/764, 715/765, 810, 835, 838, 733, 738; 707/1, 707/104.1, 705, 805; 345/440
See application file for complete search history.

(56) References Cited

U.S. PATENT DOCUMENTS

| | | | |
|---|---|---|---|
| 6,356,256 B1 | 3/2002 | Leftwich | |
| 6,476,829 B1 | 11/2002 | Smith et al. | |
| 6,545,687 B2 * | 4/2003 | Scott et al. | 345/629 |
| 7,061,490 B2 | 6/2006 | Van Koningsveld | |
| 7,133,054 B2 | 11/2006 | Aguera y Arcas | |
| 2001/0030662 A1 * | 10/2001 | Ohkawa et al. | 345/764 |
| 2003/0128212 A1 * | 7/2003 | Pitkow | 345/440 |
| 2005/0257400 A1 * | 11/2005 | Sommerer et al. | 36/13 |
| 2006/0212833 A1 * | 9/2006 | Gallagher et al. | 715/848 |
| 2006/0267982 A1 | 11/2006 | Aguera y Arcas | |
| 2006/0293904 A1 | 12/2006 | Ramanathan et al. | |
| 2007/0094243 A1 * | 4/2007 | Kwak et al. | 707/3 |
| 2007/0124291 A1 | 5/2007 | Hassan et al. | |
| 2008/0022229 A1 * | 1/2008 | Bhumkar et al. | 715/838 |
| 2008/0046840 A1 * | 2/2008 | Melton et al. | 715/825 |
| 2008/0133754 A1 * | 6/2008 | Smyth et al. | 709/226 |
| 2008/0301555 A1 * | 12/2008 | Vartiainen et al. | 715/704 |
| 2009/0100339 A1 * | 4/2009 | Wharton-Ali et al. | 715/720 |

FOREIGN PATENT DOCUMENTS

JP    2003-114895 A    4/2003

(Continued)

OTHER PUBLICATIONS

International Search Report and Written Opinion Received for PCT Application No. PCT/US2008/083988, mailed on Mar. 17, 2009, 11 pages.

(Continued)

*Primary Examiner* — Xiomar Bautista
(74) *Attorney, Agent, or Firm* — Capitol City TechLaw; Richard C. Irving

(57) ABSTRACT

A processing device and method may be provided for displaying a graph, including a number of icons. The icons may be thumbnail images of data elements of a data set. A position of the icons may indicate one or more attribute values of an associated set of attributes. A zooming-in operation may cause at least a portion of the displayed graph to be enlarged, such that at least some of the icons may be presented as enlarged, higher-resolution images. A zooming-out operation may cause the presented enlarged images to be reduced in size and presented in a context of the displayed graph. The enlarged images may include at least one selectable link. In some embodiments, when a displayed image, corresponding to an icon, is enlarged beyond a predetermined amount, the displayed image may be replaced by a corresponding data element of the data set.

20 Claims, 6 Drawing Sheets

FOREIGN PATENT DOCUMENTS

| | | |
|---|---|---|
| JP | 2006-221406 A | 8/2006 |
| JP | 2007-058686 A | 3/2007 |
| WO | W00227508 A1 | 4/2002 |

OTHER PUBLICATIONS

"Photosynth Technology Preview", retrieved at<<http://labs.live.com/photosynth/whatis/>>, pp. 2, Aug. 21, 2007.

Jansen et al., "Multiscale methods for data on graphs and irregular multidimensional situations", Nov. 21, 2006, pp. 36.

"Seadragon", retrieved at<<http://labs.live.com/Seadragon.aspx>>, pp. 1, Aug. 21, 2007.

"Scaleable Print and Collective Seeing", Jun. 8, 2007, Exact Editions, pp. 3.

* cited by examiner

VIEWING DATA

BACKGROUND

In existing systems, if a user wishes to find one or more data items with particular attributes in a large data set of schematized elements, the data set may be filtered such that a small subset of the data set may be obtained and viewed. The small subset of the data set may include a representation of the data items. For example, the representation may include images and/or text. If the user wishes to view a data item, itself, a current viewing context may be lost before the user may view the data item. Alternatively, the user may page through groupings of fixed numbers of the data items from the data set, searching for the one or more data items with the particular attributes.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device are provided for obtaining and viewing a large amount of data. A graph may be displayed on a display screen of the processing device. The graph may be a histogram or other type of graph and may include a number of icons. Each of the icons may be a thumbnail image corresponding to data elements of a data set. In some embodiments, the icons may include thumbnail images corresponding to all data elements of a data set. Each of the data elements may be associated with a set of attribute values. A position of respective ones of the icons of the displayed graph may indicate a relationship with ones of the associated set of attribute values. A user may zoom-in on one or more of the icons of the displayed graph by using a pointing device or other device. As a result of the zooming-in, the one or more of the icons may be enlarged and displayed in a higher resolution. The enlarged one or more of the icons may include one or more embedded links. Selection of one of the one or more embedded links may cause a respective action to be performed. The user may zoom-out of the enlarged one or more of the icons by using the pointing device or the other device, such that the graph of the icons may again be displayed.

In some embodiments, when an icon is enlarged beyond a predetermined amount, the icon may be replaced by a corresponding one of the data elements. The data elements may be web pages, product information, documents, or any other type of data.

Embodiments consistent with the subject matter of this disclosure may produce a displayed graph with icons including thumbnail images corresponding to data elements of a data set obtained as a result of a query to a search engine implemented on a remote device, such as, for example, a server. In other embodiments, icons of a displayed graph may be produced from data elements saved locally on the processing device.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a processing device for displaying a graph including a number of data items. Each of the data items may correspond to one of a number of data elements of a data set and may be associated with a set of attribute values. The data elements may be web pages, documents, product information, or any other type of information. In some embodiments, the data items may correspond to all of the data elements of the data set. The displayed graph may indicate a relationship between each of the data elements and an associated set of attribute values. The data items of the displayed graph may be small, low-resolution images, such as, for example, thumbnail images, corresponding to the data elements of the data set. A user may provide a command to the processing device to zoom-in on the displayed graph, such that at least one of the low-resolution images is enlarged and a resolution of the image is increased. The enlarged image may include one or more selectable embedded links. When any one of the one or more selectable links is selected, additional information regarding the corresponding data element may be displayed. In some embodiments, a selection of one of the one or more selectable embedded links may facilitate a purchase of an item corresponding to the data element.

In an alternative embodiment, the enlarged image may be replaced with a corresponding one of the data elements, when the image is enlarged by at least a predetermined amount.

The user may provide a command to the processing device to zoom-out of an enlarged image or a data element displayed as a result of a zoom-in operation, such that the graph of data items may again be displayed.

In some embodiments, the graph of data items may include a histogram such as, for example, a histogram illustrating a history of sites accessed via a network. The data items of the histogram may be thumbnail images of displayed pages from the accessed sites. In other embodiments, the graph may be another type of graph and the data items of the graph may be thumbnail images of data elements obtained from a search engine.

Exemplary Operating Environment

Figure 1:
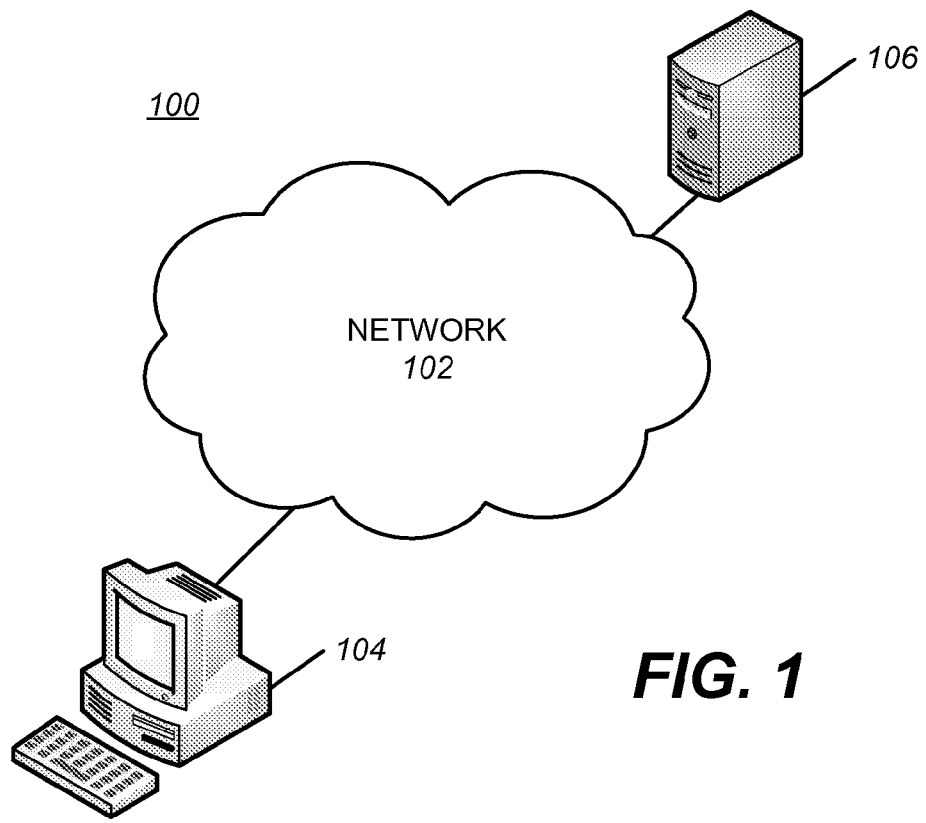
FIG. 1 illustrates an exemplary operating environment for embodiments consistent with the subject matter of this disclosure.

FIG. 1 illustrates exemplary operating environment 100 for embodiments consistent with the subject matter of this disclosure. Operating environment 100 may include a network 102, a processing device 104, and a server 106.

Processing device 104 may be a user's processing device, such as, for example, a desktop personal computer (PC), a laptop PC, a handheld processing device, or other processing device.

Network 102 may be a single network or a combination of networks, such as, for example, the Internet or other networks. Network 102 may include a wireless network, a wired network, a packet-switching network, a public switched telecommunications network, a fiber-optic network, other types of networks, or any combination of the above.

Server 106 may be a processing device or a group of processing devices configured to work together. In embodiments in which server 106 includes a group of processing devices, the processing devices may be configured as a server farm.

Although FIG. 1 illustrates an environment having one server 106, various embodiments may include more or fewer of server 106.

Exemplary Processing Device

Figure 2:
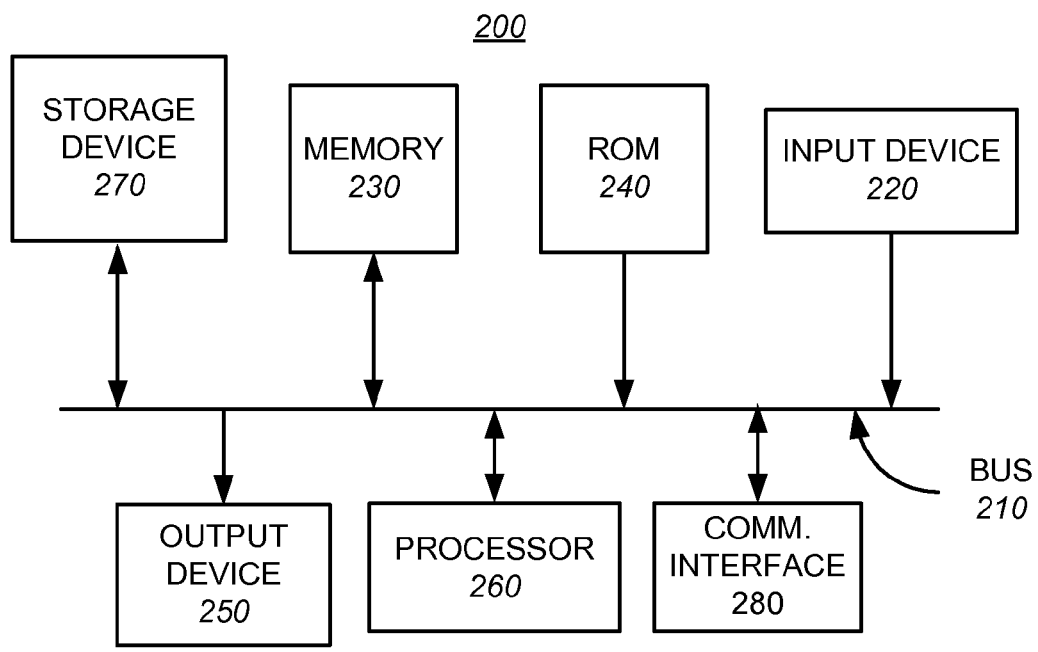
FIG. 2 illustrates an exemplary processing device which may implement embodiments consistent with the subject matter of this disclosure.

FIG. 2 is a functional block diagram of an exemplary processing device 200, which may be used in embodiments consistent with the subject matter of this disclosure to implement processing device 104 and/or server 106. Processing device 200 may include a bus 210, an input device 220, a memory 230, a read only memory (ROM) 240, an output device 250, a processor 260, a storage device 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Storage device 270 may include a compact disc (CD), digital video disc (DVD), a magnetic medium, or other type of storage device for storing data and/or instructions for processor 260. Communication interface 280 may include a wired or wireless interface for communicating to other devices via network 102.

Input device 220 may include a keyboard, a joystick, a pointing device or other input device. Output device 250 may include one or more conventional mechanisms that output information, including one or more display screens, or other output devices.

Processing device 200 may perform such functions in response to processor 260 executing sequences of instructions contained in a tangible machine-readable medium, such as, for example, memory 230, ROM 240, storage device 270 or other medium. Such instructions may be read into memory 230 from another machine-readable medium or from a separate device via communication interface 280.

Exemplary Display

Figure 3:
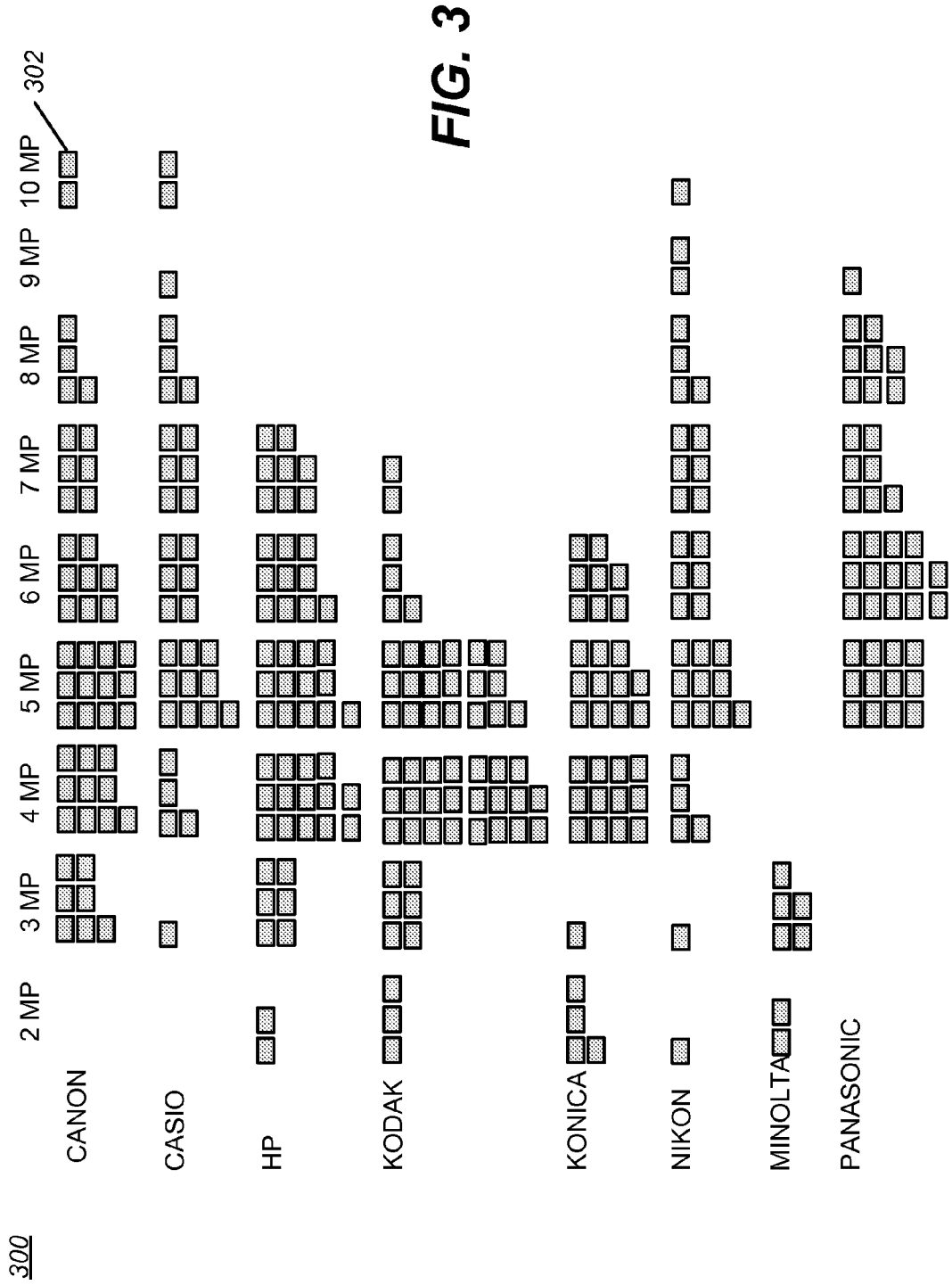
FIG. 3 illustrates an exemplary graph, including thumbnail images, which may be produced by embodiments consistent with the subject matter of this disclosure.

FIG. 3 illustrates an exemplary display 300 including a graph. A layout of the graph may be predefined. In some embodiments, the layout of the graph may be configurable. The graph of exemplary display 300 may be produced as a result of a user requesting information such as, for example, information regarding a product (for example, cameras), or other information. The graph may include a number of icons 302, which, in this example, may be thumbnail images having information describing cameras. In exemplary display 300, a vertical axis may be labeled according to a number of values of a brand attribute. For example, the vertical axis of exemplary display 300 lists brands Canon, Casio, HP, Kodak, Konica, Nikon, Minolta, and Panasonic. A horizontal access of exemplary display 300 lists a number value of a megapixel attribute. For example, exemplary display 300 lists attribute values for 2 megapixels through 10 megapixels.

In this example, the graph includes icons representing all data elements of a data set. Viewing the graph, a user may determine that a large number of cameras are in a mid-range, with respect to megapixels, and the mid-range may be 4 megapixels through 7 megapixels. A high end of the megapixel range may be 8 megapixels through 10 megapixels, which may include cameras for professional photographers or serious amateur photographers. A number of cameras are produced by HP, Kodak, Konica, Nikon, and Minolta having a low to mid range number of megapixels. Panasonic, Nikon, Casio and Canon have some cameras in the high-end megapixel range.

The user may enter one or more commands to zoom-in on one or more of the icons 302. For example, a user may use a pointing device such as, for example, a computer mouse with a scroll wheel, or other device, to move the displayed graph up, down, left, right, or diagonally, and to zoom-in on the one or more of the icons 302. Zooming-in may cause the one or more of the icons 302 to be enlarged and displayed with higher resolution than a thumbnail image.

Figure 4:
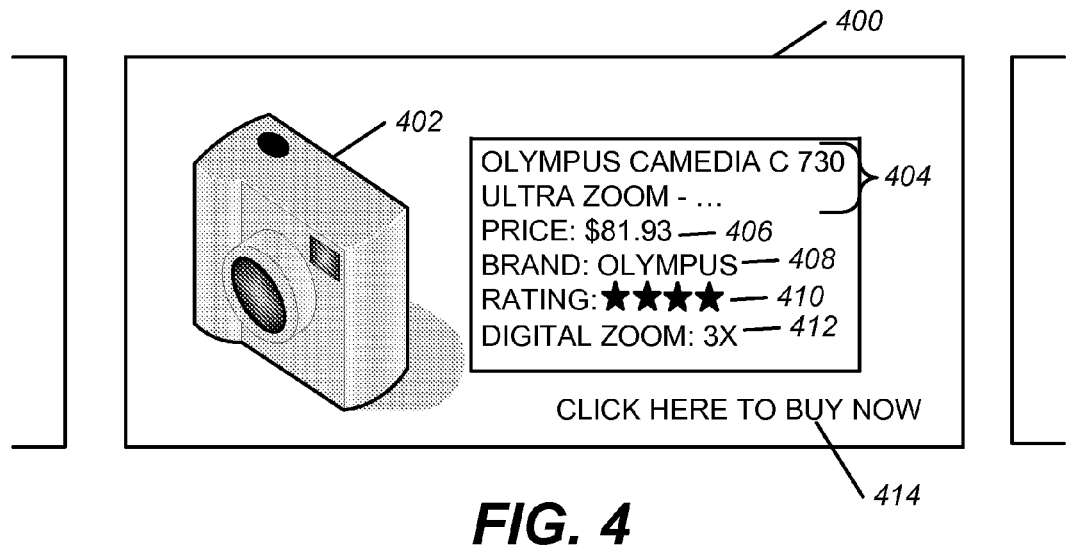
FIG. 4 illustrates an exemplary thumbnail image enlarged as a result of a zooming-in operation.

FIG. 4 illustrates an enlarged one of the one or more of the icons 302 after a zooming-in operation. In this example, an enlarged image 400 may be displayed showing a picture of a product 402, along with information such as, for example, a name of the product 404, a brand of the product 408, a price of the product 406, a rating of the product 410, one or more features of the product 412, and/or other information. Further, the enlarged image may include at least a portion of an enlarged image corresponding to one or more thumbnail images, which may surround icon 502 corresponding to enlarged image 400, in the displayed graph. Enlarged image 400 may include an embedded link 414, which may be selected by a user via a pointing device such as, for example, a computer mouse, or other device. Selection of the embedded link 414 may cause additional information to be displayed regarding the product, or, in some embodiments, may cause a display to appear, which may facilitate purchasing of the product. In some embodiments, enlarged image 400 may include multiple embedded links 414.

Figure 5:
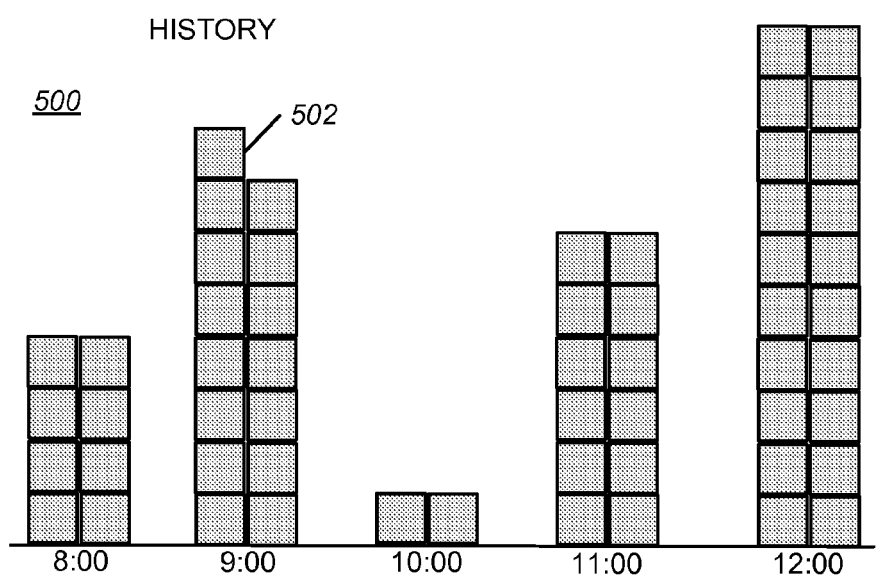
FIG. 5 illustrates an exemplary histogram including thumbnail images representing accessed web pages.

FIG. 5 illustrates an exemplary display 500 including a graph. In this example, exemplary display 500 includes a number of icons 502, each of which may be a thumbnail image of a page accessed through a network. Icons 502 make up a histogram illustrating a history of pages accessed over a period of time such as, for example, a period of hours, days, weeks, or another time period.

In exemplary display 500, the histogram illustrates a history of pages accessed between 8 a.m. and 12 p.m. on a particular day. A user may zoom-in on one or more of the icons 502 by using a pointing device such as, for example, a computer mouse, or other device. As an example, a user may move exemplary display 500 in a left, right, up, down, or diagonal direction by clicking a computer mouse on a portion of exemplary display 500 and dragging the computer mouse in the left, right, up, down, or diagonal direction. The user may zoom-in by, for example, using a scroll wheel of the computer mouse. In other embodiments, other devices and methods may be employed to move exemplary display 500 and zoom-in on one or more of icons 502.

Figure 6:
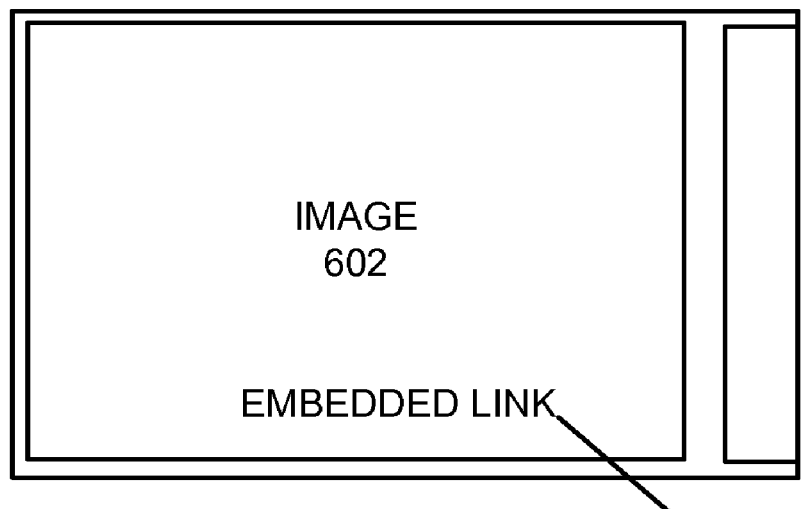
FIG. 6 shows an enlarged image based on zooming-in on one of the thumbnail images of FIG. 5.

As a result of zooming-in, one or more of icons 502 may be enlarged and displayed in a higher resolution. Further, a context in which the plurality of thumbnail images is displayed may be retained, such that the graph later may be displayed again as a result of a zooming-out operation. FIG. 6 illustrates one of icons 502 of FIG. 5 displayed as a larger, higher-resolution image 602. Further, as a result of zooming-in, portions of one or more surrounding icons 502 may be enlarged and displayed in a higher resolution image. FIG. 6, shows a portion of an enlarged, higher-resolution image on a right side of image 602, corresponding to a second one of icons 502. Image 602 may include one or more embedded links 604, which may be selected by a user using a pointing device, or other device. Selection of one of one or more embedded links 604 may cause an action to be performed such as, for example, more detailed information regarding image 602 to be displayed, or another action.

Figure 7:
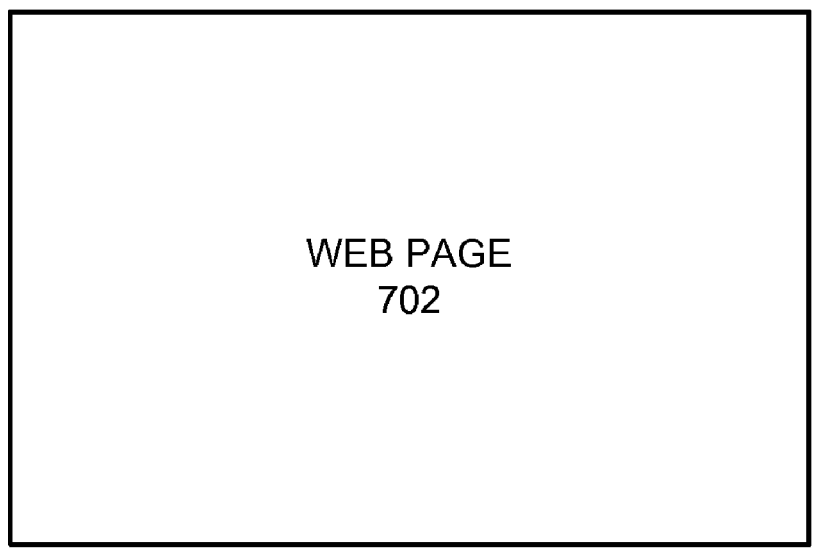
FIG. 7 shows an exemplary web page, which may be produced by enlarging a thumbnail image of the histogram of FIG. 5 beyond a predetermined amount.

In some embodiments, when one of a number of icons of a graph is enlarged beyond a predetermined amount, a resulting enlarged, higher-resolution image may be replaced with a display of a data element represented by the image. For example, with respect to FIGS. and 5 and 6, one or more icons 502 may be enlarged, as shown by enlarged, higher-resolution image 602 of FIG. 6. When one of icons 502 are enlarged beyond a predetermined amount, the one of icons 502 may be replaced by a data element. In this example, the data element may be a page, such as a web page 702, as shown by FIG. 7. In other embodiments, the data element may be a document, product information, or another type of data.

Exemplary Processing

Figure 8:
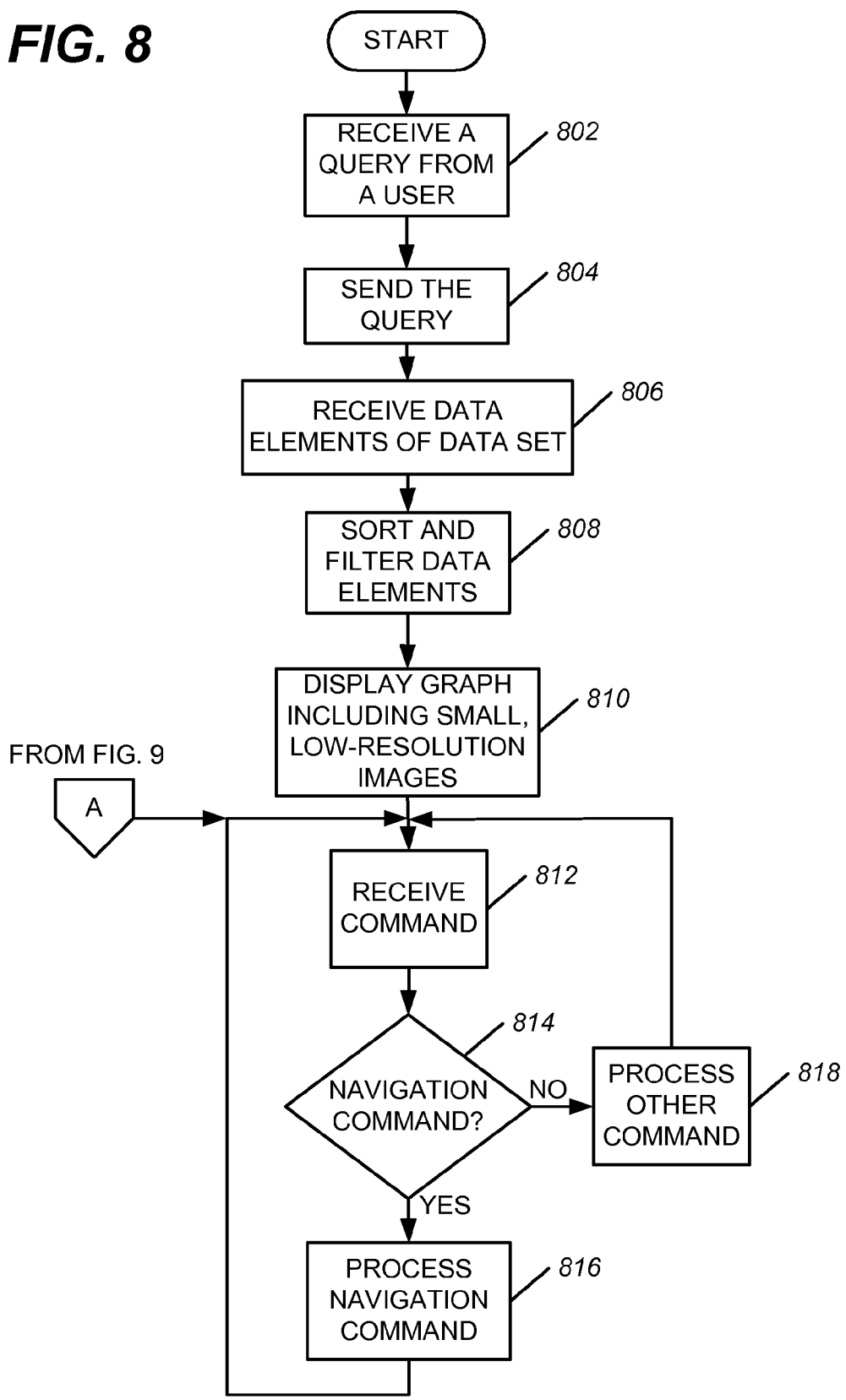
FIGS. 8-9 are flowcharts illustrating exemplary processing, which may be performed in embodiments consistent with the subject matter of this disclosure.

FIG. 8 is a flowchart of an exemplary process, which may be performed by a processing device such as, for example, processing device 104, in embodiments consistent with the subject matter of this disclosure. The process may begin with processing device 104 receiving a query from a user (act 802). The query may be directed to a service such as, for example, a search engine, an electronic catalog, or other service. Processing device 104 may send the query to a server such as, for example, server 106 (act 804).

Processing device 104 may then receive a number of data elements of a data set from a server 106 as a result of sending the query (act 806). In some embodiments, processing device 104 may receive all the data elements of a data set. The data elements may be web pages, documents, data describing product available for purchase, or other information.

Processing device 104 may then sort and filter the received data elements (act 808). For example, the received data elements may be sorted and filtered based on values of one or more attributes associated with each of the data elements. Referring back to the camera example, the data elements may be sorted and filtered based on brand of camera and number of megapixels. Of course, other data elements may be sorted and filtered based on values of other attributes.

Next, processing device 104 may create small, low-resolution images (thumbnail images) based on the sorted and filtered data elements and may display a graph including the thumbnail images as icons or data items of the graph (act 810). The graph may be a histogram, a bar chart, or other type of graph. A position of respective ones of the icons may indicate a value of one or more associated attributes.

Next, processing device 104 may receive a command from the user (act 812). The command may be a navigation command such as, for example, a command to move the displayed graph in a left, right, up, down, or diagonal direction, a zoom-in command, a zoom-out command, or an other command. Processing device 104 may then determine whether the received command is a navigation command (act 814). If the received command is not a navigation command, then processing device 104 may process the received command (act 818) and may repeat act 812. If the received command is determined to be a navigation command, processing device 104 may process the received navigation command (act 816) and act 812 may again be performed to receive a next command.

Figure 9:
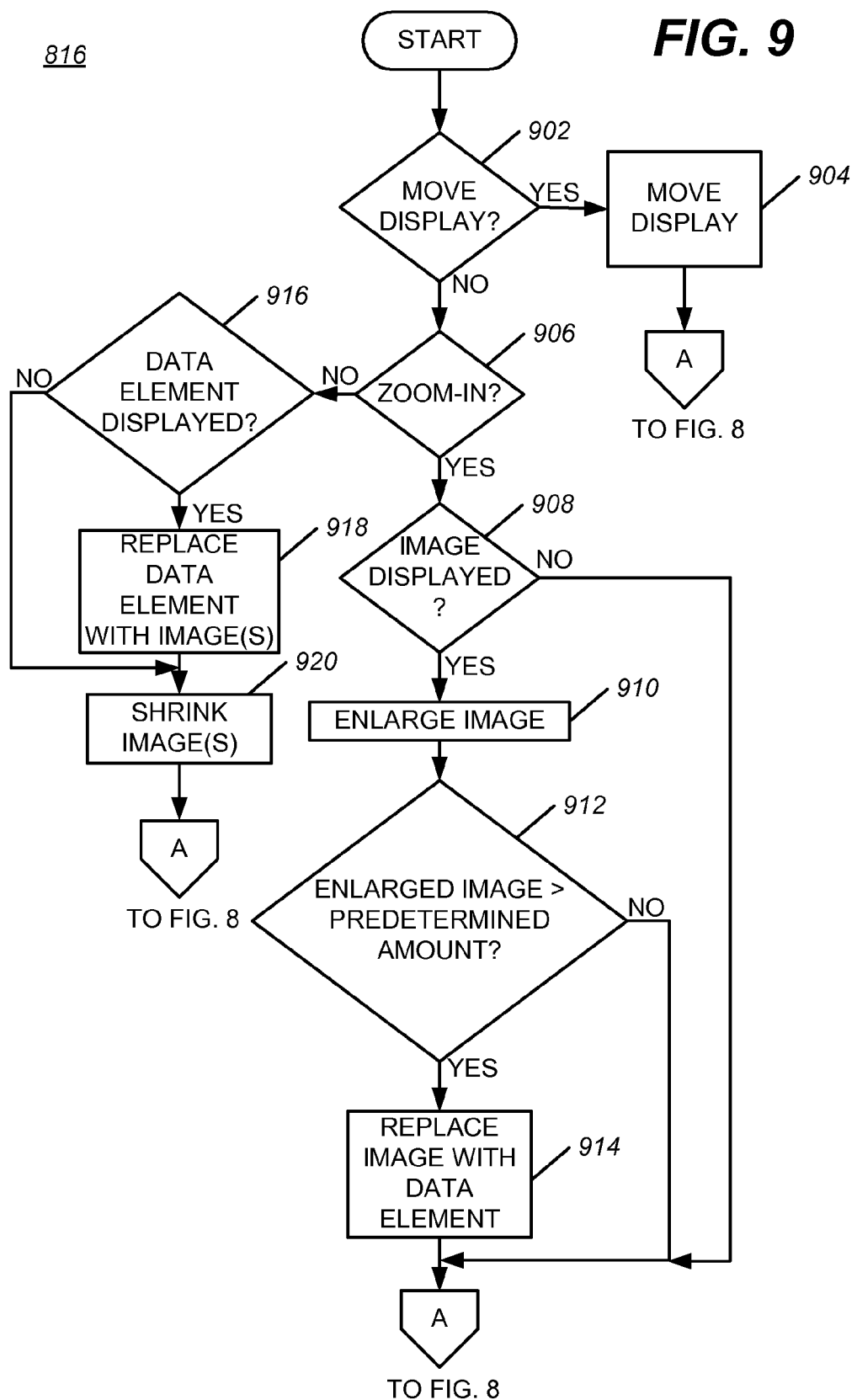

FIG. 9 is a flowchart illustrating processing with respect to act 816, regarding processing a navigation command, in an embodiment consistent with the subject matter of this disclosure. The processing may begin with a processing device 104 determining whether the navigation command is for moving a display (act 902). As mentioned previously, the displayed may be moved up, down, left, right, and diagonally. If the navigation command is for moving the display, then the display may be moved, accordingly (act 904). Processing device 104 may then perform act 812 (FIG. 8) to receive a next command.

If, during act 902, processing device 104 determines that the received command is not a command for moving the display, then processing device 104 may determine whether the command is a zoom-in command (act 906). If processing device 104 determines that the command is a zoom-in command, then processing device 104 may determine whether an image is currently displayed (act 908). The image may include one or more thumbnail images or and an enlarged, high-resolution image, corresponding to one or more thumbnail images.

If processing device 104 determines that an image is currently being displayed, then processing device 104 may enlarge the image and display the image in a higher resolution (act 910). The enlarged image may include one or more selectable embedded links, as previously described. Processing device 104 may then determine whether the enlarged image has been enlarged by more than a predetermined amount from an original thumbnail image size (act 912). If processing device 104 determines that the enlarged image has not been enlarged by more than a predetermined amount from an original thumbnail image size, then processing device 104 may repeat act 812 (FIG. 8) to receive a next command. Otherwise, processing device 104 may replace the displayed image with a display of a data element represented by the displayed image (act 914). Processing device 104 may then repeat act 812 (FIG. 8) to receive a next command.

If, during act 908, processing device 104 determines that an image is not being displayed, then a data element may currently be displayed and, because displayed data elements may not be an enlarged, processing device 104 may perform act 812 (FIG. 8) to receive a next command.

If, during act 906, processing device 104 determines that the received navigation command is not a zoom-in command, then processing device 104 may assume that the received navigation command is a zoom-out command. Processing device 104 may then determine whether a data element (and not an image of a data element) is displayed (act 916). If processing device 104 determines that a data element is displayed, then processing device 104 may replace the displayed data element with a displayed image, which may further include displayed images corresponding to surrounding data items (act 918).

Processing device 104 may then shrink the displayed image(s) such that a smaller, lower-resolution image(s) may be displayed (act 920). The shrunken displayed image(s) may include at least a portion of an originally displayed graph. Processing device 104 may then perform act 812 (FIG. 8) to receive a next command.

In some embodiments, processing device 104 may not send a query to a remote device such as, for example, server 106, and may not receive data elements of a data set from the remote device. An example of such an embodiment may include, for example, a processing device which a user may use to view web pages. The user may request to view a history of web pages accessed during a particular time period, such as an hour, day, week, or other time period. Processing device 104 may access saved images of the web pages, based on saved historical information, or may access the web pages and may save web page information as images. Thus, data elements may be obtained from the saved historical information instead of performing acts 802-806 to obtain the data elements as a result of a query to a remote device. Acts 808-818 and 902-920 (FIG. 9) may be performed, as described previously.

As another example of an embodiment in which processing device 104 may not send a query to a remote device, processing device 104 may have access to data describing a particular product, such as cameras, or any other product. Processing device 104 may access the data, which may be called tradecards, each of which may include information describing attributes of a particular instance of the product and may further include an image of the particular instance of the product. Processing device 104 may sort and filter all of the tradecards based on attribute values associated with each of the tradecards. The tradecards may then be displayed as icons on a graph. For example, if one assumes that icons 302 of FIG. 3 are stored tradecards, then processing device 104 may organize and display the tradecards in a manner as shown in FIG. 3, and may enlarge the tradecards as shown in FIG. 4, upon receiving a command from a user.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, only the appended claims and their legal equivalents define the invention, rather than any specific examples given.

We claim as our invention:

1. A machine-implemented method of graphically conveying information with respect to a plurality of data items, the machine-implemented method comprising:
    displaying a graph including the plurality of data items, each of the plurality of data items corresponding to a respective one of a plurality of web pages and being displayed as a small, low-resolution image of the respective one of the plurality of web pages, the graph including a histogram, formed from the small, low-resolution images of the plurality of web pages, illustrating a history of web pages accessed during a particular time period; and
    zooming-in on the displayed graph, in response to a command received from a user, such that a larger, higher-resolution image corresponding to at least one of the plurality of data items is displayed.

2. The machine-implemented method of claim 1, further comprising:
    zooming-out of the displayed graph, in response to a second command received from the user, such that a smaller lower-resolution image corresponding to the at least one of the plurality of data items is displayed.

3. The machine-implemented method of claim 1, further comprising:
    replacing the displayed image corresponding to the at least one of the plurality of data items with at least a corresponding one of the plurality of web pages when the displayed image is enlarged by at least a predetermined amount as a result of the zooming-in.

4. The machine-implemented method of claim 1, further comprising:
    replacing the displayed image corresponding to the at least one of the plurality of data items with the at least one of the plurality of data items when the displayed image is enlarged by at least a predetermined amount as a result of the zooming-in.

5. The machine-implemented method of claim 1, wherein when the displayed image corresponding to the at least one of the plurality of data items is enlarged by at least a predetermined amount, the displayed image includes at least one selectable embedded link.

6. The machine-implemented method of claim 1, wherein the displaying of the graph including the plurality of data items comprises displaying the plurality of data items corresponding to all of a plurality of data elements of a data set.

7. The machine-implemented method of claim 1, wherein when the displayed image corresponding to the at least one of the plurality of data items is enlarged by at least a predetermined amount, the displayed image includes at least one selectable embedded link, selection of one of the at least one selectable embedded link causing an action to be performed.

8. The machine-implemented method of claim 1, further comprising obtaining the plurality of data items based on saved historical information.

9. A machine-readable storage medium having instructions recorded thereon for at least one processor, the instructions comprising:

instructions for displaying a plurality of thumbnail images as data items of a graph, each of the thumbnail images being a thumbnail image of a respective one of a plurality of web pages, the graph illustrating a history of web pages accessed during a particular time period;

instructions for zooming-in on the displayed plurality of thumbnail images resulting in at least one displayed enlarged image corresponding to at least one of the displayed thumbnail images; and instructions for zooming-out of the at least one displayed enlarged image resulting in a display including at least one small image corresponding to the at least one displayed enlarged image.

10. The machine-readable storage medium of claim 9, wherein the instructions for zooming-in on the displayed plurality of thumbnail images resulting in at least one displayed enlarged image corresponding to at least one of the displayed thumbnail images further comprise:

instructions for replacing one of the at least one displayed enlarged image with the respective one of the plurality of web pages.

11. The machine-readable storage medium of claim 9, wherein the at least one displayed enlarged image includes at least one selectable link when the at least one displayed enlarged image is enlarged by at least a predetermined amount.

12. The machine-readable storage medium of claim 9, wherein a layout of the graph is predefined.

13. The machine-readable storage medium of claim 9, wherein a layout of the graph is configurable.

14. The machine-readable storage medium of claim 9, wherein the instructions for zooming-in on the displayed plurality of thumbnail images further comprise instructions for retaining a context in which the plurality of thumbnail images is displayed.

15. The machine-readable storage medium of claim 9, further comprising:

instructions for creating the plurality of thumbnail images based on the plurality of web pages.

16. The machine-readable storage medium of claim 9, further comprising:

instructions for accessing saved images of at least some of the plurality of web pages based on saved historical information.

17. The machine-readable storage medium of claim 9, wherein each of the plurality of thumbnail images is based on saved historical information.

18. A processing device comprising:

at least one processor; and a memory connected to the at least one processor, the memory comprising:

instructions for displaying a graph including a plurality of thumbnail images, each of the plurality of thumbnail images being a thumbnail image of a respective one of a plurality of web pages, the graph being formed by the plurality of thumbnail images and illustrating a history of web pages accessed during a particular time period, instructions for zooming in on the displayed graph, in response to receiving a command from a user, such that a larger, higher-resolution image corresponding to at least one of the plurality of thumbnail images is displayed, the larger, higher-resolution image including at least one selectable link, and instructions for zooming out from the displayed larger, higher-resolution image such that the displayed graph including the plurality of thumbnail images is displayed.

19. The processing device of claim 18, wherein the memory further comprises:

instructions for replacing the larger, higher-resolution image with a corresponding one of the plurality of web pages when the displayed larger, higher-resolution image is enlarged by at least a predetermined amount as a result of zooming-in on the displayed graph.

20. The processing device of claim 18, wherein the memory further comprises instructions for obtaining the plurality of thumbnail images based on saved historical information.

* * * * *